(12) United States Patent
Fateev

(10) Patent No.: US 9,170,915 B1
(45) Date of Patent: Oct. 27, 2015

(54) REPLAY TO RECONSTRUCT PROGRAM STATE

(75) Inventor: Maxim E. Fateev, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 964 days.

(21) Appl. No.: 13/311,960

(22) Filed: Dec. 6, 2011

(51) Int. Cl.
*G06F 9/44* (2006.01)
*G06F 11/34* (2006.01)
*G06F 9/50* (2006.01)
*G06F 9/38* (2006.01)

(52) U.S. Cl.
CPC .......... *G06F 11/3414* (2013.01); *G06F 9/3836* (2013.01); *G06F 9/3871* (2013.01); *G06F 9/5038* (2013.01)

(58) Field of Classification Search
None
See application file for complete search history.

(56) References Cited

U.S. PATENT DOCUMENTS

| | | | |
|---|---|---|---|
| 5,717,614 A | 2/1998 | Shah et al. | |
| 5,784,613 A | 7/1998 | Tamirisa | |
| 5,870,545 A | 2/1999 | Davis et al. | |
| 6,253,369 B1 * | 6/2001 | Cloud et al. | 717/136 |
| 6,601,234 B1 * | 7/2003 | Bowman-Amuah | 717/108 |
| 6,829,771 B1 | 12/2004 | Bahrs et al. | |
| 8,032,860 B2 | 10/2011 | Piehler et al. | |
| 8,117,500 B2 | 2/2012 | Ng | |
| 2002/0046230 A1 | 4/2002 | Dieterich et al. | |
| 2002/0180810 A1 * | 12/2002 | Charters et al. | 345/853 |
| 2003/0226062 A1 | 12/2003 | Gender et al. | |
| 2004/0230873 A1 | 11/2004 | Ward | |
| 2005/0071187 A1 * | 3/2005 | Zubizarreta | 705/1 |
| 2005/0246692 A1 | 11/2005 | Poteryakhin et al. | |
| 2006/0059253 A1 * | 3/2006 | Goodman et al. | 709/223 |
| 2007/0234129 A1 | 10/2007 | Shukla et al. | |
| 2008/0320338 A1 | 12/2008 | Ward | |
| 2009/0133033 A1 | 5/2009 | Lindo et al. | |
| 2009/0158099 A1 | 6/2009 | Cui | |
| 2010/0131745 A1 | 5/2010 | Meijer et al. | |
| 2010/0138415 A1 | 6/2010 | Lein | |
| 2010/0229052 A1 | 9/2010 | Cuneo et al. | |
| 2011/0010690 A1 | 1/2011 | Howard et al. | |
| 2011/0282829 A1 | 11/2011 | Rangaswamy et al. | |
| 2011/0321017 A1 | 12/2011 | Kapoor et al. | |
| 2012/0324282 A1 | 12/2012 | Asad et al. | |
| 2013/0104041 A1 * | 4/2013 | Seshagiri et al. | 715/704 |

OTHER PUBLICATIONS

Co-Owned U.S. Appl. No. 12/489,960 for "Scalable Workflow Processing" filed Jun. 23, 2009, 45 pages.

* cited by examiner

*Primary Examiner* — Insun Kang
(74) *Attorney, Agent, or Firm* — Knobbe, Martens, Olson & Bear, LLP

(57) ABSTRACT

The state of a workflow application in a distributed computing environment can be reconstructed by replaying previously executed portions of the workflow application. Embodiments maintain non-serialized event data relating to workflow history and use the data to determine subsequent actions to take in order to advance the workflow. In some embodiments, workflow instances can be serialized in order to create a checkpoint.

26 Claims, 10 Drawing Sheets

REPLAY TO RECONSTRUCT PROGRAM STATE

BACKGROUND

Companies and organizations often have business processes that are performed on a routine basis. The processes can involve multiple discrete or composite actions, some of which can be performed in any order, others which must be performed in parallel or in some other specific order. Such processes are often modeled as workflows. A workflow can be the orchestration of multiple actions. Computer systems can be used to process workflows and orchestrate the execution of the component actions. In order to facilitate processing of a workflow by a computer system, the workflow can be defined in a workflow definition language (WDL). Graphical tools have been created to simplify the process of defining workflows in various WDLs.

BRIEF DESCRIPTION OF THE DRAWINGS

Throughout the drawings, reference numbers may be reused to indicate correspondence between referenced elements. The drawings are provided to illustrate example embodiments described herein and are not intended to limit the scope of the disclosure.

DETAILED DESCRIPTION

Various embodiments including systems and methods for asynchronous processing of distributed programs are described herein. For example, a workflow processing system can be implemented as a distributed system, with multiple components executing on any number of computing devices.

A workflow can be the orchestration of multiple actions. Execution of some actions can depend on the results of other actions, and therefore the actions are performed in a series. In some cases, actions can be independent of each other and can be performed asynchronously, in parallel, etc. Typically, each action of a workflow is atomic, e.g.: each action comprises a single activity. In some cases, an action can be a composite of multiple activities which may be dependant on, or independent of, each other. Computer systems are often used to process workflows and orchestrate the execution of the component actions. In order to facilitate processing of a workflow by a computer system, the workflow can be defined in a workflow definition language (WDL). Graphical tools have been created to simplify the process of defining workflows in various WDLs.

One problem, among others, presented by this workflow development paradigm is that workflow models created using graphical WDL tools often break down when the modeled workflow is complex. Design of asynchronous workflows using standard programming languages, however, can be cumbersome, and the resulting programs difficult to debug. Embodiments described herein facilitate development of stateless asynchronous workflow processing applications using standard programming languages and synchronous-like code, including exception-based error handling. It should be noted, however, that the claimed subject matter is not limited to implementations that solve any or all disadvantages noted in any part of this disclosure.

Various aspects of the disclosure will now be described with regard to certain examples and embodiments, which are intended to illustrate but not to limit the disclosure.

Workflow Processing Environment

Figure 1:
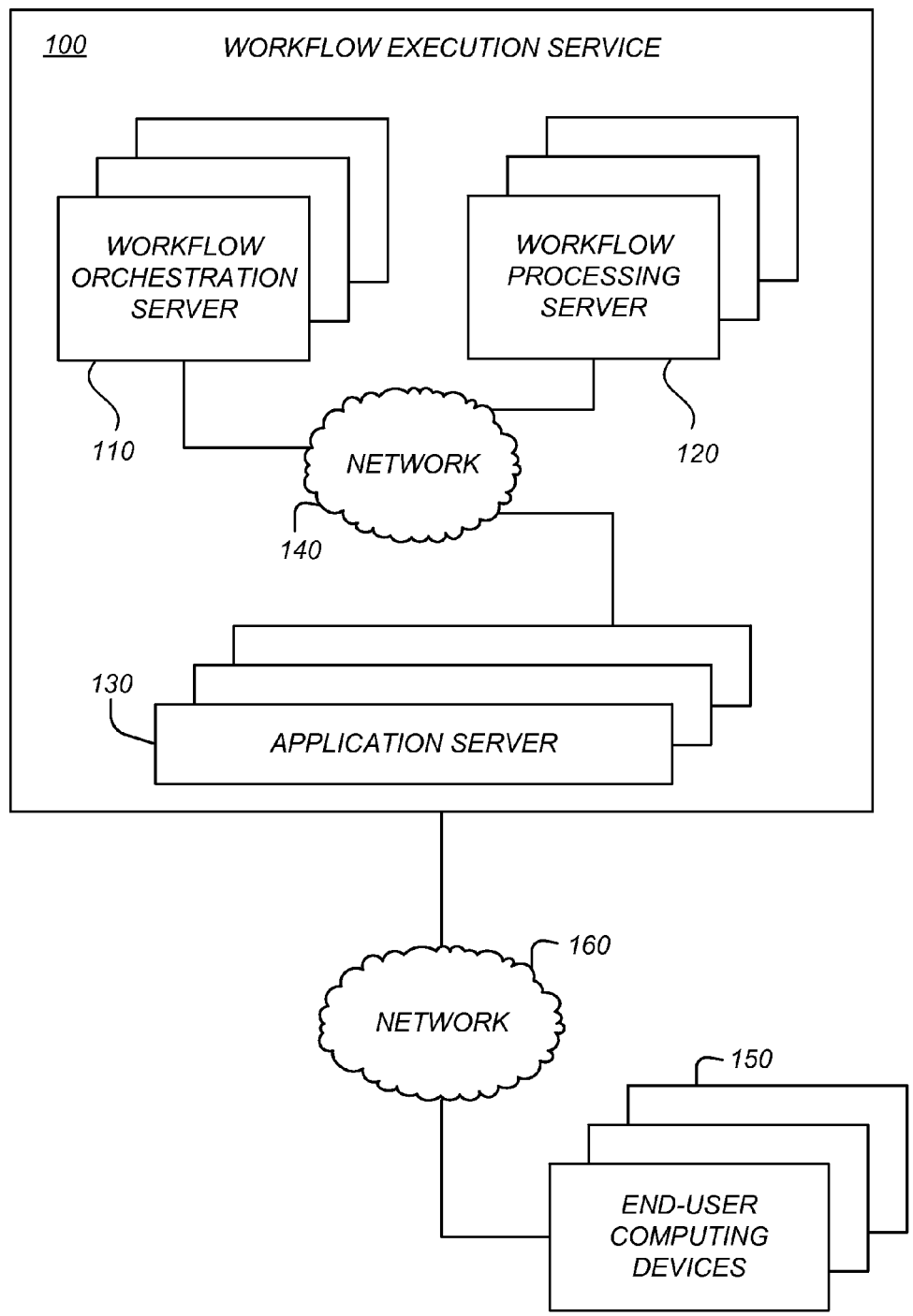
FIG. 1 is a network diagram schematically illustrating an example of a workflow execution service that can provide computing resources to process workflow instances in response to events received from internal and external sources.

FIG. 1 is a network diagram schematically illustrating an example workflow execution service 100. The workflow execution service 100 is depicted in FIG. 1 as operating in a distributed computing environment comprising several computer systems that are interconnected using one or more computer networks. The workflow execution service 100 could also operate within a computing environment having a fewer or greater number of components than are illustrated in FIG. 1. In addition, the workflow execution service 100 could include various web services and/or peer-to-peer network configurations. Thus, the depiction of the workflow execution service 100 in FIG. 1 should be taken as illustrative and not limiting. The workflow execution service 100 includes a workflow orchestration server 110, a workflow processing server 120, an application server 130, and a network 140.

The workflow orchestration server 110, workflow processing server 120, and application server 130 can communicate over the network 140. The network 140 can be any wired network, wireless network or combination thereof. In addition, the network 140 can be a personal area network, local area network, wide area network, cable network, satellite network, cellular telephone network, the Internet, etc., or any combination thereof. Each of the workflow orchestration server 110, workflow processing server 120, and application server 130 can be a physical computing device configured to execute software applications. In some embodiments, the servers 110, 120, 130 can be configured to execute one or more software applications on the same single physical or virtual device, across multiple physical/virtual devices, or any combination thereof.

One or more end-user computing devices 150 can communicate with the various components of the workflow execution service 100 over a network 160. The end-user computing devices 150 can be any of a number of computing devices that are capable of communicating over a network including, but not limited to, a laptop, personal computer, personal digital assistant (PDA), hybrid PDA/mobile phone, mobile phone, electronic book reader, digital media player, tablet, and the like. The network 160 can be a network similar to the network 140 of the workflow execution service 100.

In operation, the workflow orchestration server 110 can receive notification of an event from the application server 130 or an end-user computing device 150. In response, the workflow orchestration server 110 can load a new instance of a workflow into a workflow queue. In some embodiments, the specific workflow instantiated in response to the event can depend based on the event, with various events associated with different workflows, etc. The workflow processing server 120 can be configured to poll the workflow orchestration server 110 for queued workflows to process, and can receive information about queued workflows that the workflow processing server 120 is configured to process. In some embodiments, the workflow processing server 120 can expose an API or other method of being invoked by a separate process. For example, the workflow processing server 120 can be configured as a web service. Rather than polling the workflow orchestration server 110 for queued workflows to process, the workflow processing server 120 can be invoked remotely through a web method when a workflow is ready for processing.

Processing of a workflow can involve determining which activity or activities to execute or schedule for execution based on the current event. Each time the workflow processing server 120 processes an activity, it can generate a command, raise an error, or otherwise initiate a notification to the workflow orchestration server 110, which the workflow orchestration server 110 can save in a workflow history. In some embodiments, the command can be an instruction to execute a program or routine, to start or stop a timer, to send a message to another component or an external process, etc. The workflow process can then be queued for further processing.

In one non-limiting example, the application server 130 can be a web server hosting a network resource, such as a retail web site. An operator of an end-user computing device 150 can using a web browsing application to connect to the application server 130 and initiate the purchase of a product order through the retail web site hosted by the application server 130. The application server 130 can raise an event or otherwise generate a notification to the workflow orchestration server 110 that a purchase is ready to be processed. The workflow orchestration server 110 can instantiate a new purchase workflow and place the workflow instance in a workflow queue, as described in detail below. The workflow processing server 120 can be configured to poll the workflow orchestration server 110 at regular intervals to determine whether a purchase workflow needs to be processed. In response to a purchase workflow instance being placed in the workflow queue, the workflow orchestration server 110 can respond to a poll from the workflow processing server 120 with information about the purchase workflow instance. In this example, the information can include data related to the customer, product, payment, shipping, etc. The workflow processing server 120 can then launch a module of program code designed to process the purchase workflow. The purchase workflow module can determine that the first action to execute is to confirm that the product to be purchased is currently available in inventory, reserving a unit if it is available or returning a notification if it is not. In response to that determination, the purchase workflow module can issue a command, scheduling the inventory confirmation activity for execution.

In some embodiments, the workflow processing server 120 terminates the purchase workflow module after the activity is scheduled, removing all state information from memory. In these implementations, some method of recreating the program state in order to respond to events and schedule the subsequent activities of the purchase workflow can be implemented, such as serialization/deserialization or workflow replay, as described below. In this example, the subsequent activities can include processing of payment information, fraud prevention, notification to warehouse personnel to pack and ship, notification to the customer that the order has been placed or shipped, follow-up by customer service, etc. Depending upon the specific programming of the purchase workflow module, some of these activities can be required to complete successfully before execution of other activities, such as processing of payment information. Others can be scheduled for execution at any time, such as customer service follow-up.

Figure 2:
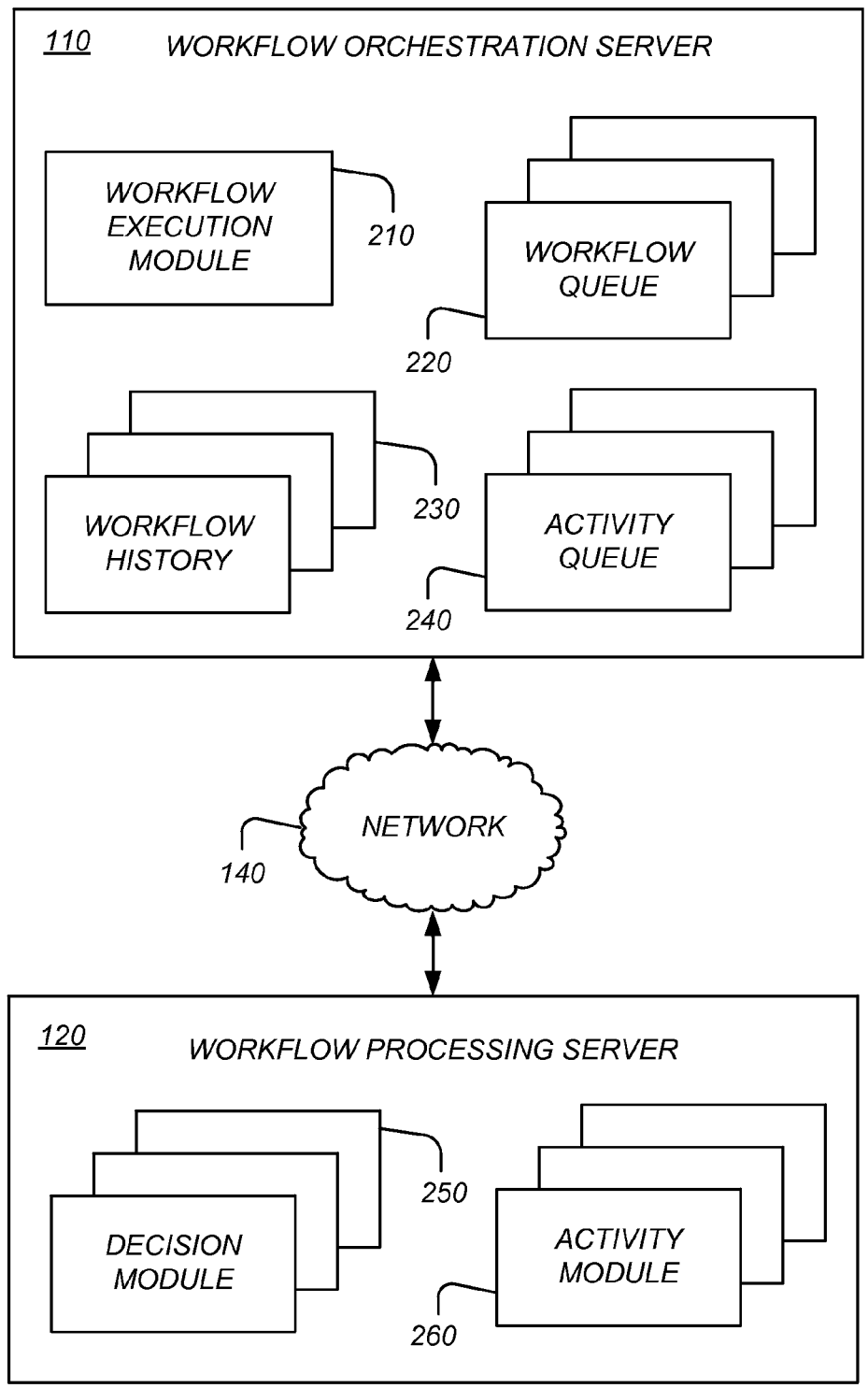
FIG. 2 is a block diagram illustrating a workflow orchestration server and workflow processing server, in accordance with one embodiment.

FIG. 2 illustrates examples of a workflow orchestration server 110 and a workflow processing server 120 in greater detail. As described above, the servers 110, 120 can be individual servers or can represent multiple servers such as might be arranged, for example, in a server bank. The servers 110, 120 can be in data communication with each other over various networks, such as network 140. As described above, network 140 can be the Internet, an intranet, a wide area network (WAN), local area network (LAN), wireless network, peer-to-peer network, or any other suitable network or combination thereof. In some embodiments, all of the functional components executed in the servers 110, 120 can be executed within a single server or the same pool of servers.

The workflow orchestration server 110 can include a workflow execution module 210, one or more workflow queues 220, one or more workflow histories 230, and one or more activity queues 240. The workflow execution module 210 can be executed to orchestrate the implementation workflow instances. Implementation of workflow instances can involve placement of a workflow, or data related to a workflow, in the workflow queue 220. As illustrated in FIG. 2, there can be multiple workflow queues 220, each queue corresponding to a different type of workflow, a different workflow processing server 120, a combination thereof, or any other logical separation of queued workflows, including those determined by load balancing techniques, etc. In one embodiment, each workflow queue 220 can be employed to temporarily store pointers associated with respective workflow instances. In order to place a workflow instance into a workflow queue 220, a pointer associated with the workflow instance can be placed in the workflow queue 220, with the workflow instance stored in an appropriate location of an electronic data store, such as a memory, database, hard disk, etc.

The workflow execution module 210 can be a computer executable program or collection of programs. Each workflow history 230 can be associated with a workflow instance orchestrated by the workflow execution module 210. The workflow histories 230 can each comprise, for example, a list of events that have occurred during the implementation of a given workflow instance over time. The events listed in a given workflow history 230 can include activities executed on behalf of the workflow instance, such as the scheduling of an activity, the execution of an activity, the completion of an activity, the starting or stopping of a timer, etc. The workflow history can act as a record of the implementation of a workflow instance. The workflow histories 230 can be stored in an electronic data store, such as a memory, database, hard disk, etc.

The various components implemented on the workflow processing server 120 can include decision modules 250. The workflow execution service 100 provides an advantage in that the processing of workflows is much more flexible because the workflow definitions are embodied in functional code in the decision modules 250. The complexity and extensiveness of modern day workflows can be adequately represented using functional code that is flexible and can meet all exceptions or permutations of processing and is not restricted to data expressions of WDLs. Each of the decision modules 250 can be configured to identify the activities, actions, or steps to be performed for a specific workflow instance based upon the functional expression of a workflow definition. Each decision module 250 can embody a workflow definition in the form of functional logic as may be expressed, for example, in terms of programmed code such as Java. Alternatively, the decision module 250 can be programmed using any one of a number of different existing programming languages. In one embodiment, each different decision module 250 comprises a Java class that may be instantiated multiple times. Thus, there can be many instances of each decision module 250 executed by a workflow processing server 120 at any given time.

The components executed on the workflow processing server 110 can also include activity modules 260. Activity modules 260 can be executed to perform one or more actions, tasks, or functions that comprise at least a portion of a given workflow instance based upon a command from a decision module 250. The activity modules 260 can be implemented as Java classes that are each instantiated multiple times in order to handle the workflow processing load from the decision modules 250. An activity queue 240 on the workflow orchestration server 110 can be associated with each type or class of activity module 260. In response to a decision module 250 issuing a command to execute an activity module 260, the workflow execution module 210 can place the command in the activity queue 240 to be executed by the corresponding activity module 260

The workflow execution service 100 can be configured to implement workflow instances that perform various functions. For example, a workflow instance can be a process to implement the payment for a purchase of an item though a retail web site. Such a process can involve various actions or tasks, including inputting a credit card number, performing a fraud check on the credit card number, and sending a shipment request to a fulfillment center to implement fulfillment of the order. There can be many other actions or tasks involved in such a process, where the above actions or tasks are described merely for the purposes of illustration. A workflow can involve various components, persons, applications, and other entities that are involved in the processing of data to complete a workflow instance. In the case of the processing of payment for an order, for example, such an order can be processed through various departments and other entities for ultimate authorization and purchase. Workflows can have hundreds or even thousands of actions. The workflow execution service 100 can be configured to orchestrate hundreds, thousands, or more separate workflow instances in substantially real time, many more than a human could process. In some cases, the multiple workflows can be processed simultaneously.

A given workflow instance can involve human intervention at some point, or may be entirely automated. The human intervention can involve interaction with a given activity module 260, a process which can take hours, weeks, or even longer to complete. For example, supervisor approval may be in order to issue a refund, etc. In order to prevent the accumulation in memory of workflow instances in various stages of completion that would result from such lengthy delays, the decision modules 250 can be process the workflows asynchronously, scheduling activities and then terminating and being removed from memory. The decision module 250 can then be reloaded into memory in response to the workflow execution module 210 of the workflow orchestration server 110 placing the workflow instance back into a workflow queue 220 for further processing.

The workflow execution module 210 is configured to respond to requests from the decision modules 250 for workflow instances 212 to implement. Each instance of a decision module 250 polls the workflow execution module 210 to determine whether there are any workflow instances represented in a corresponding workflow queue 220 for the decision module 250. In response to the poll, the workflow execution module 210 can examine the workflow queue 220 associated with the decision module 250 to determine whether there are any workflow instances that are ready to be advanced.

In response to a workflow instance being listed in a workflow queue 220 at the time a corresponding decision module 250 polls the workflow execution module 210, the workflow execution module 210 can retrieve the workflow history 230 for the workflow instance. The workflow execution module 210 can also obtain other data associated with the respective workflow instance from an electronic data store or other location. Once the workflow history 230 and other information embodying the workflow instance are obtained, the workflow execution module 210 can return the data to the polling decision module 250.

After the workflow history 230 and other information embodying the workflow instance are received by the polling decision module 250, the decision module 250 can examine the workflow history 230 in order to determine a next action to be scheduled. Thereafter, the decision module 250 can send a command to the workflow execution module 210 to schedule the next action of the workflow instance, which will be performed by an activity module 260. In some embodiments, the decision module 250 can schedule multiple activity modules 260 to implement multiple actions in parallel. In some embodiments, the command initiated by the decision module 250 can be an instruction to execute a program or routine, to start or stop a timer, to send a message to another component or an external process, etc.

Upon receiving the command to schedule execution of an activity, the workflow execution module 210 can proceed to schedule the activity. This may involve placing the workflow instance in an activity queue 240 that is associated with an activity module 220. The actions performed by the activity modules 260 can be atomic in nature, involving steps or actions associated with the workflow instance. Alternatively, an activity module 260 may perform actions that are not atomic in nature, such as the creation of a separate workflow instance that is placed in a workflow queue 220 for further action.

Once the activity module 260 has completed performance, it can send a message to the workflow execution module 210 that processing is complete. The workflow execution module 210 can store the message in the appropriate workflow history 230, and proceed to list the workflow instance in the corresponding workflow queue 220 again so that the next action can be determined by the decision module 250. It should be noted that a command issued by a decision module 250 indicates a next action to be taken for a workflow instance. Such action can be an action or task inherent in the workflow, or can comprise closing the workflow instance when the workflow is complete. If the workflow is complete, it is not placed in a workflow queue 220.

Each workflow history 230 can list all of the events or other activities that have occurred for a corresponding workflow instance. For example, such events can include scheduling a workflow instance to be processed by a decision module 250 or activity module 260, the start and completion of processing of a workflow instance, any timeouts that occur with respect to the processing of a the workflow instance, etc.

Reconstructing the State of Applications

The decision modules 250 can be stateless programs, as described above. By definition, the internal program data of stateless programs does not persist from one invocation to the next. In one embodiment of the workflow execution service 100, the only data that is persisted is the command that is issued by the decision module 250, which becomes part of the workflow history 230. However, the workflow history 230 alone may not provide enough information to determine the next activity to perform. For example, the decision module 250 may perform certain preliminary processing during the determination of a first activity to be scheduled, and can populate program variables with data about the processing. In order to determine later activities to schedule, the decision module 250 may require access to that data. Because the decision module 250 is stateless, that data is no longer available.

One solution to this problem is to serialize the program state to a data store in between executions of the decision module 250. In this solution, each subsequent invocation of the decision module 250 for a specific workflow will start with a deserialization of the program state. Serialization/deserialization can be expensive, both in terms of the amount of space required to store the program state, and in terms of the network bandwidth required to retrieve the data from the data store if the data store is located on a different physical machine than the decision module 250. Moreover, some data structures are unable to be serialized and deserialized efficiently.

By creating decision modules 250 that interact with only the workflow history 230 and a limited set of other data that is present when the workflow instance begins, the workflow can be replayed from the beginning on subsequent invocations. Furthermore, the decision modules 250 can be configured to replay the workflow without affecting the overall processing of the workflow instance. The decision module 250 can be conceptualized as a non-deterministic state machine. The next output may not be determinable based solely on the previous output and/or input. However, by analyzing all prior inputs and outputs and replaying all internal manipulations thereof, the next output (the next activity to be scheduled) can be accurately determined.

As described above, in one embodiment the only outputs from the decision modules 250 are commands to execute an activity or series of activities, rather than actual execution of those activities. The commands are sent to the workflow execution module 210 of the workflow orchestration server 110 to be placed in the activity queue 240. The commands are executed in response to the workflow execution module 210 executing the activity module 260 associated with the command in the activity queue 240. One benefit of this design is that a decision module 250 can begin execution from an initial state during each invocation, whether or not it has already processed a portion of the workflow instance. By inspecting the workflow history 230 that is received with the workflow instance, the decision module 250 can continue execution after issuance of a command when there is a record in the workflow history 230 that the command has been successfully executed. Various methods of ignoring, deleting, or otherwise disregarding all previously issued command can be implemented, and the result is that only the newest commands are able to be placed in the activity queue 240 by the workflow execution module 210. Thus, there is no adverse effect such as the issuance of duplicate commands to execute an activity.

Figure 3A:
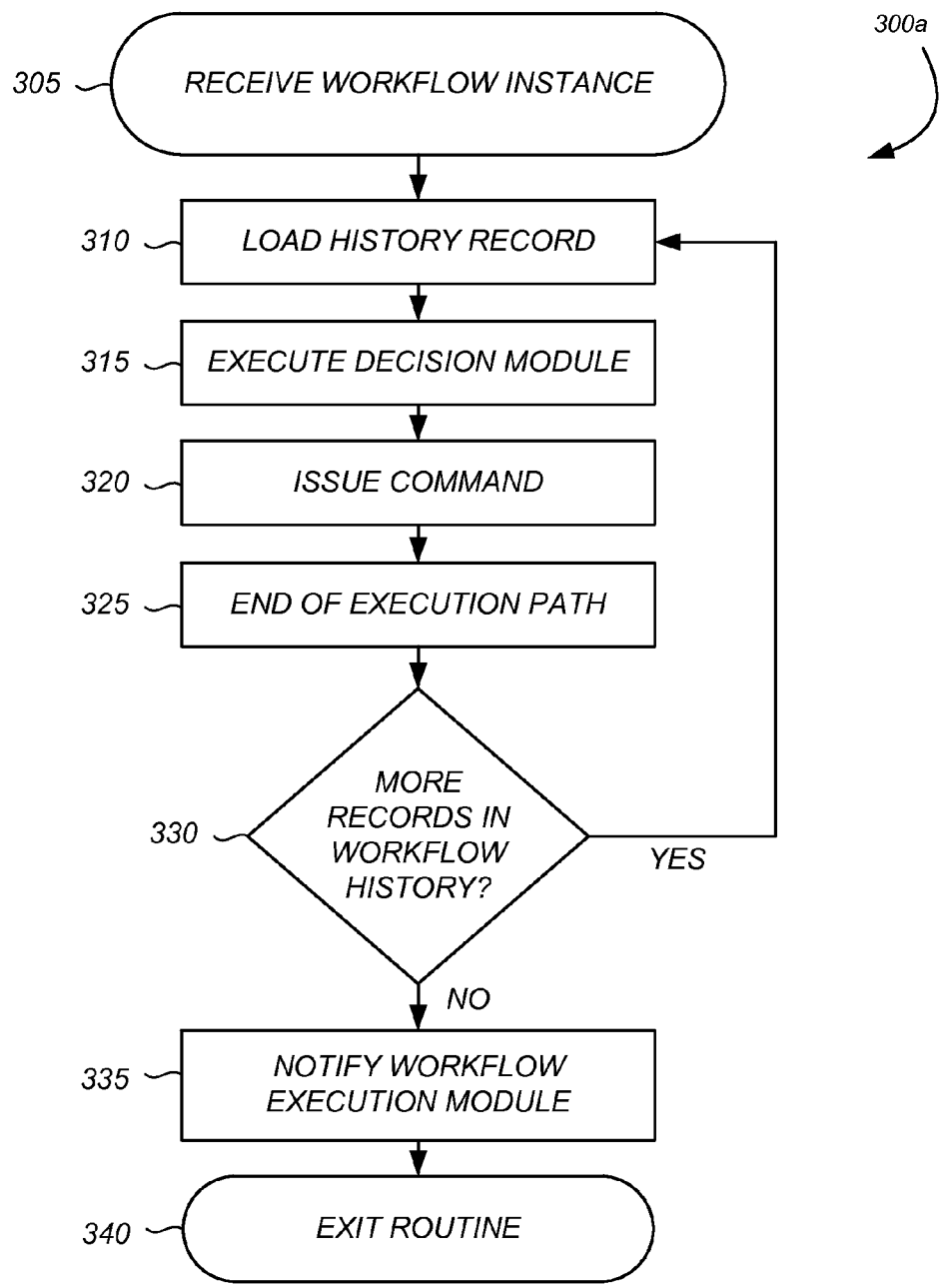
FIG. 3A is a flow diagram illustrating a sample routine for resuming the program state of a decision module for processing workflows, in accordance with one embodiment.

FIG. 3A is a flow diagram illustrating a sample routine 300*a* for execution of a stateless decision module 250. The routine 300*a* resumes the program state of the decision module 250 in accordance with the description above by replaying the entire history of the workflow instance so that subsequent activity commands can be issued. For example, the workflow can instance involve the processing of a product purchase on a retail web site. A decision module 250 developed to process such purchases can be implemented on a workflow processing server 120, and can periodically poll the workflow orchestration server 110 for workflow instances to process.

At block 305, the decision module 250 receives a workflow instance to process from the workflow execution module 210 of the workflow orchestration server 110.

The routine 300*a* proceeds to block 310, where the first record from the workflow history can be loaded. In some embodiments, the records can be streamed from the workflow history 230, record-by-record. In some embodiments, the entire workflow history 230 for this instance of the workflow is received. In this example, a purchase has just been submitted for processing, and therefore the workflow history 230 for this workflow instance may have only one record, indicating the beginning of the workflow and potentially including parameters or other initialization data. Execution of the routine 300*a* can then proceed to block 315.

At block 315, workflow execution commences under the control of the decision module 250. In this example, a purchase has been submitted and the first activity programmed into the decision module 250 for this workflow is verification that the product purchased is in stock. One feature of the workflow execution service 100 is the distribution of processing among different components, and the encapsulation of processing logic within the different components. Therefore, the specifics of how to verify that the product is in stock are not necessarily included in the decision module 250; rather, they are encapsulated in an activity module 260 designed specifically for that purpose.

At block 320, the decision module 250 can then issue a command to execute the activity module 260 associated with the inventory confirmation action. The command can be kept in a temporary area of memory until a later step of the routine 300*a*.

Execution of the routine 300*a* can proceed until block 325, when the decision module encounters the end of an execution path. Note that the end of an execution path may be only temporary, and is not necessarily the termination of the execution path. In some embodiments, the execution path may be blocked until further processing occurs. For example, when the decision module 250 issues a command in block 320, the decision module 250 may be required to wait for the successful completion of that command before continuing execution. In some embodiments, more than one command may have been issued prior to encountering the end of the execution path at block 315.

The routine 300*a* then proceeds to decision block 330, where the decision module 250 determines whether there are any more records in the workflow history 230 to be loaded. For example, the workflow history 230 may contain a record that the command which was issued in block 320 has been scheduled for execution. In such as case, the decision module 340 can remove that command from the temporary area of memory so that the command is not scheduled for execution again. In another example, the workflow history 230 may contain a record that the command which was issued in block 320 has completed execution. In such a case, the decision module 340 may be able to advance down an execution path that was previously blocked, etc. If the decision module 250 determines at block 330 that these or any other additional records are in the workflow history 230 to load and process, execution of the routine 300a can return to block 310. Otherwise, execution of the routine 300a can proceed to block 335.

At block 335, the decision module 250 notifies the workflow execution module 210 of the newly issued commands. In one embodiment, a list of all newly issued commands is transmitted to the workflow execution module 210, which then determines which commands to place in the corresponding activity queues 240 and when to do so.

Execution of the routine 300a then proceeds to block 340, where the decision module 250 is terminated and all internal state information is lost. A new decision module 250 can be instantiated to poll the workflow execution module 210 to determine whether there are any workflow instances listed in a respective workflow queue 220 that are to be processed by the decision module 250.

Once the inventory confirmation activity has been executed by an activity module 260, a confirmation record can be entered into the workflow history 230. In the present example, once the product to be purchased is confirmed to be in available inventory, the workflow instance is returned to the workflow queue 220 for further processing, such as receiving payment for the purchase, etc. In response to the polling of the decision module 250, the workflow execution module 210 examines the respective workflow queue 220 to identify whether any workflow instances are ready for processing, and can return the workflow instance for the product purchase, along with the newly updated workflow history 230, to the decision module 250. Processing of the workflow again begins at block 305, and proceeds to block 310, where the first record from the workflow history is loaded. Execution of the routine 300a can then proceed to block 315.

At block 315, the decision module 250 does not immediately determine the next action to be taken for the workflow instance. Rather, the routine 300 begins as though no command has been issued and no activity has been executed thus far. In the current example, the decision module 250 determines that the inventory should be checked to confirm that the product to be purchased is in stock.

At block 320, the decision module 250 issues the same command that it issued during the previous execution of the routine 300, described above. The command can be placed in a temporary area of memory that is managed by the decision module 250 to hold commands prior to transmission to the workflow orchestration server 110. As before, the decision module 250 then encounters the end of the execution path at block 325, because in this example cannot continue until the inventory has been confirmed. The routine 300 then proceeds to decision block 330.

At decision block 330, the execution path departs from the path taken during the previous execution of the routine 300, described above. The decision module 250 determines whether there are more records in the workflow history to load and process. In the current example, the workflow history 230 includes a record that it did not include during the previous execution, indicating that the inventory confirmation activity has completed, and that the product is in stock. The routine 300a returns to block 310 to load the record from the workflow history 230, and proceed to block 315 to determine the next activity that should be performed to process the current workflow instance.

At block 315, the decision module 250 determines that the next activity to be performed in the current workflow instance is to receive payment for the product. The routine 300a proceeds to block 320.

At block 320, the decision module 250 issues the second command of the current workflow instance that will actually be executed, and the third command overall. The command is for the execution of the payment processing action, as implemented by an activity module 260 developed for that purpose. The command can be placed into the temporary area of memory for commands along with the inventory confirmation command issued previously. The decision module 250 may perform additional processing and issue additional commands before reaching a new end of the current execution path at block 325.

The routine 300a then proceeds to decision block 330, where the decision module 250 determines whether there are additional records in the workflow history 230 to load and process. In the current example, the decision module determines that there are no additional records, and execution of the routine 300a can proceed to block 335.

At block 335, the decision module 250 notifies the workflow execution module 210 of the newly issued command, which in the example is a command to execute the activity module 260 implementing the payment processing activity.

Execution of the routine 300a then proceeds to block 340, where the decision module 250 is terminated and all internal state information is lost. A new decision module 250 can be instantiated to poll the workflow execution module 210 to determine whether there are any workflow instances listed in a respective workflow queue 220 that are to be processed by the decision module 250.

In response to the command received from the decision module 250, the workflow execution module 210 can place the workflow instance in the activity queue 240 associated with the activity module 260. When queuing the activity command, the workflow execution module 210 can record an event in the workflow history 230. The activity module 260 can then proceed to perform one or more tasks associated with the workflow instance. In this example, the activity module 260 can verify that the credit card number received is valid, that the account associated with the number has sufficient funds to cover the amount charged, etc.

Once the activity module 260 has completed its one or more actions or tasks, then the activity module 260 can transmit a message to the workflow execution module 210. Upon receiving such message from the activity module 260, the workflow execution module 210 can record the completion in the workflow history 230. Thereafter, the workflow execution module 210 can place the workflow instance back into the respective workflow queue 220 for further processing.

When the processing of the respective tasks by the activity module 260 was unsuccessful for some reason, the activity module 260 can send a message indicating the failure or error to the workflow execution module 210. The workflow execution module 210 can record an event in the workflow history 230 indicating the failure or error, and then place the workflow instance back into the respective workflow queue 220.

Figure 3B:
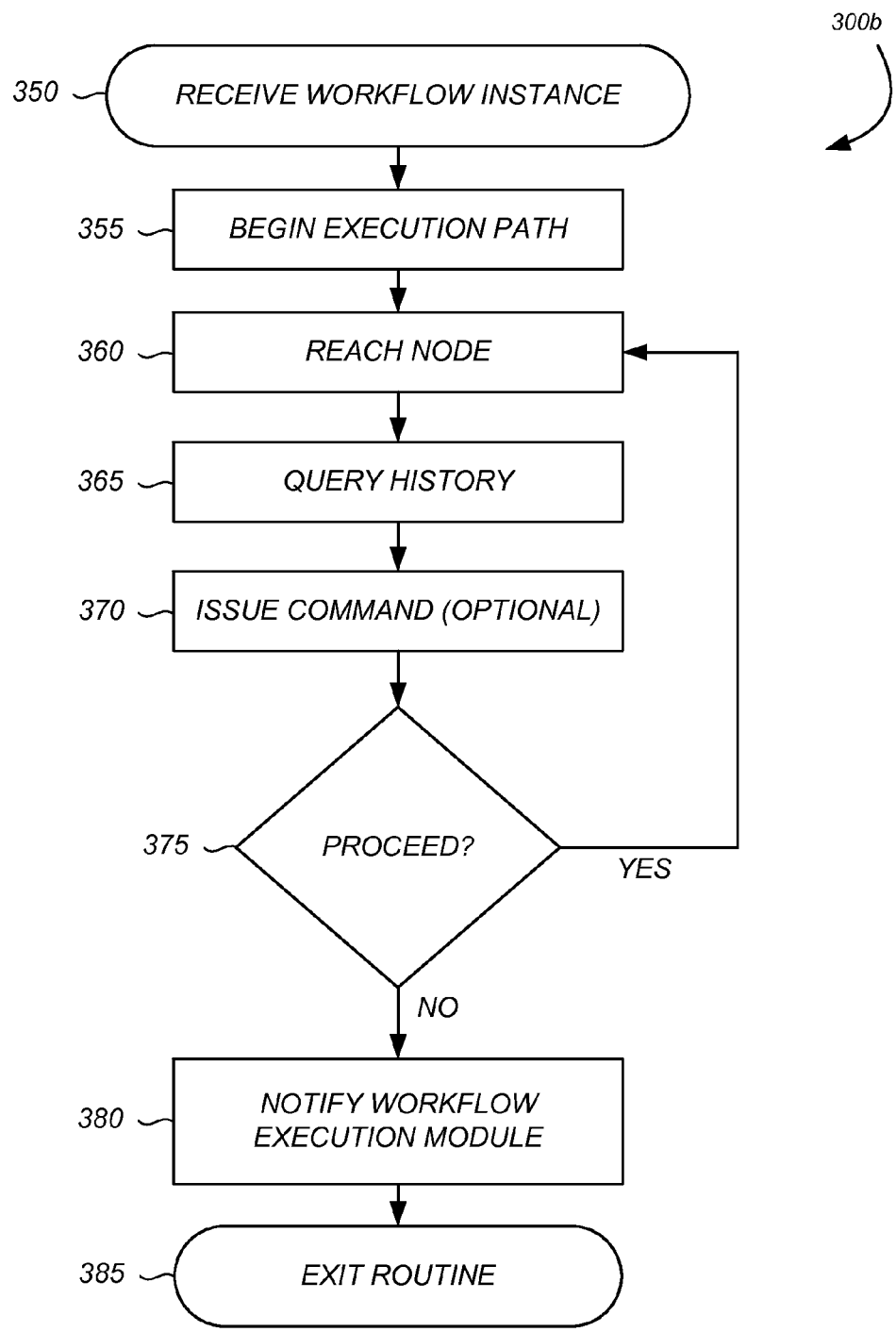
FIG. 3B is a flow diagram illustrating a sample routine for resuming the program state of a decision module for processing workflows, in accordance with one embodiment.

FIG. 3B illustrates a graph-based routine 300b for resuming a workflow. The routine 300b begins at block 350. As opposed to the routine 300a illustrated in FIG. 3A and described above, the routine 300b of FIG. 3B requires the complete workflow history 230 to be available to the decision module 250, in order to determine the status of the commands and other actions represented by nodes in the graph.

Execution of the routine 300b proceeds to block 355, where execution of the decision module 250 begins down one execution path of the graph. Returning to the example above, if the decision module 250 is processing a purchase, and the inventory confirmation activity has already completed, the decision module 250 can continue down the execution path until the payment processing step is encountered.

At block 360, a node corresponding to a decision or other action of the workflow can be reached. For example, the node can correspond to the payment processing command. The routine 300b can then proceed to block 365.

At block 365, the decision module 250 can query the workflow history 230 for a record corresponding to the payment processing command. To facilitate such queries, the workflow history 230 can be indexed. In one example, the workflow history 230 may contain a record that the payment processing command has completed, or that the command has been scheduled but not completed. In such a case, the decision module 250 could skip the optional block 370 of the routine 300b, where it would issue the command if the command were not already issued, and proceed directly to decision block 375. In another example, the workflow history 230 may not contain a record corresponding to the payment processing command. In such a case, the decision module 250 would proceed to block 370 of the routine 300b, and issue the payment processing command before proceeding to decision block 375.

At block 375 the decision module 250 determines whether to continue down the execution path. For example, a customer service follow-up may need to be scheduled. Execution of the routine 300b can return to block 355 to begin processing that node, execution path, determining which commands have been issued and which other events have occurred, issuing new commands, etc. When further advancement down the execution path is blocked, the routine 300b can proceed to block 380.

At block 380, the decision module 250 can submit any pending commands for execution to the execution module 210. Execution of the routine 300b then proceeds to block 385, where the routine 300b terminates. When an activity has been completed or another workflow-advancing event occurs, the routine 300b can begin again with one or more new records in the workflow history 230, and the decision module 250 can potentially advance further down the execution path.

In some embodiments, serialization/deserilalization can be used instead of, or in conjunction with, the replay method described above. For example, failsafe checkpoints can be taken periodically when doing so will not adversely impact system performance, while a failure to resume the current state would. Checkpoints can be taken at other times, for example when the serialization of a workflow instance will require less space in a data store than the workflow history would require. In many implementations of the workflow execution service 100, the workflow history 230 is located on a physically separate computing device than the decision modules 250 which execute the workflow instance. In such implements, serialization/deserialization can be a viable alternative when network transmission of a serialized workflow instance is more efficient than network transmission of a workflow history.

Distributed Program Processing

One method, among others, of implementing a distributed system, such as the workflow system described above, is to embody the workflow decision and activity logic in an asynchronous workflow processing application. Another method of implementing a distributed system, such as the workflow system described above, is through the use of parallel programming techniques such as multi-threading. One problem, among others, with implementing such asynchronous/parallel/multi-threaded solutions is that it can be difficult to code and debug such systems. For example, as described above, workflow systems modeled in WDLs can become cumbersome and often break down when the modeled workflow becomes complex.

Development of stateless, asynchronous distributed systems using standard programming languages and synchronous-like code, including exception-based error handling, is described below. This allows programmers to code asynchronous systems using code that is similar or identical to the synchronous code the programmers may already be familiar with. It should be noted that the description below applies to parallel and multi-threaded solutions as well. Moreover, although the description below uses, as an illustrative embodiment, a workflow processing system, it should be noted that the description applies to any distributed system.

An asynchronous application can perform the functions of the decision module 250, activity queue 220, and activity modules 260 described above. A workflow execution module 210, workflow queues 220, and workflow histories 230 can still be implemented to orchestrate multiple workflow instances and definitions. The asynchronous workflow processing application can also leverage the method of resuming a stateless workflow application, described above.

The advantageous asynchronous method of implementing a workflow system described herein can reduce or prevent blocking of threads. In one embodiment, the workflow system executes on a single thread, increasing the need for reduced thread blocking. In some embodiments, the workflow system executes in a single process which may not have threads, but which has a single logical thread of execution. Rather than having program instructions and activities execute synchronously, they can instead be scheduled for execution. Program instructions and activities which depend on other program instructions to populate variables and otherwise perform pre-processing steps can associate callbacks with those variables, and rather than blocking a thread while waiting for the instruction to execute, the original instruction can be invoked in response to all variables being ready to be accessed. In one embodiment, the callbacks can be managed by the variables that the program instructions reference.

In one example, an end user initiates the purchase of a product through a retail website. The workflow orchestration server 110 can queue an instance of a purchase workflow, and provide data associated with the instance, for example a workflow history 230 and other data provided by the end user, to an asynchronous workflow processing application that is polling the workflow orchestration server 110. The asynchronous workflow processing application can determine actions to execute, schedule execution of those actions, and provide the specific logic that will be executed when the action is executing.

Figure 4:
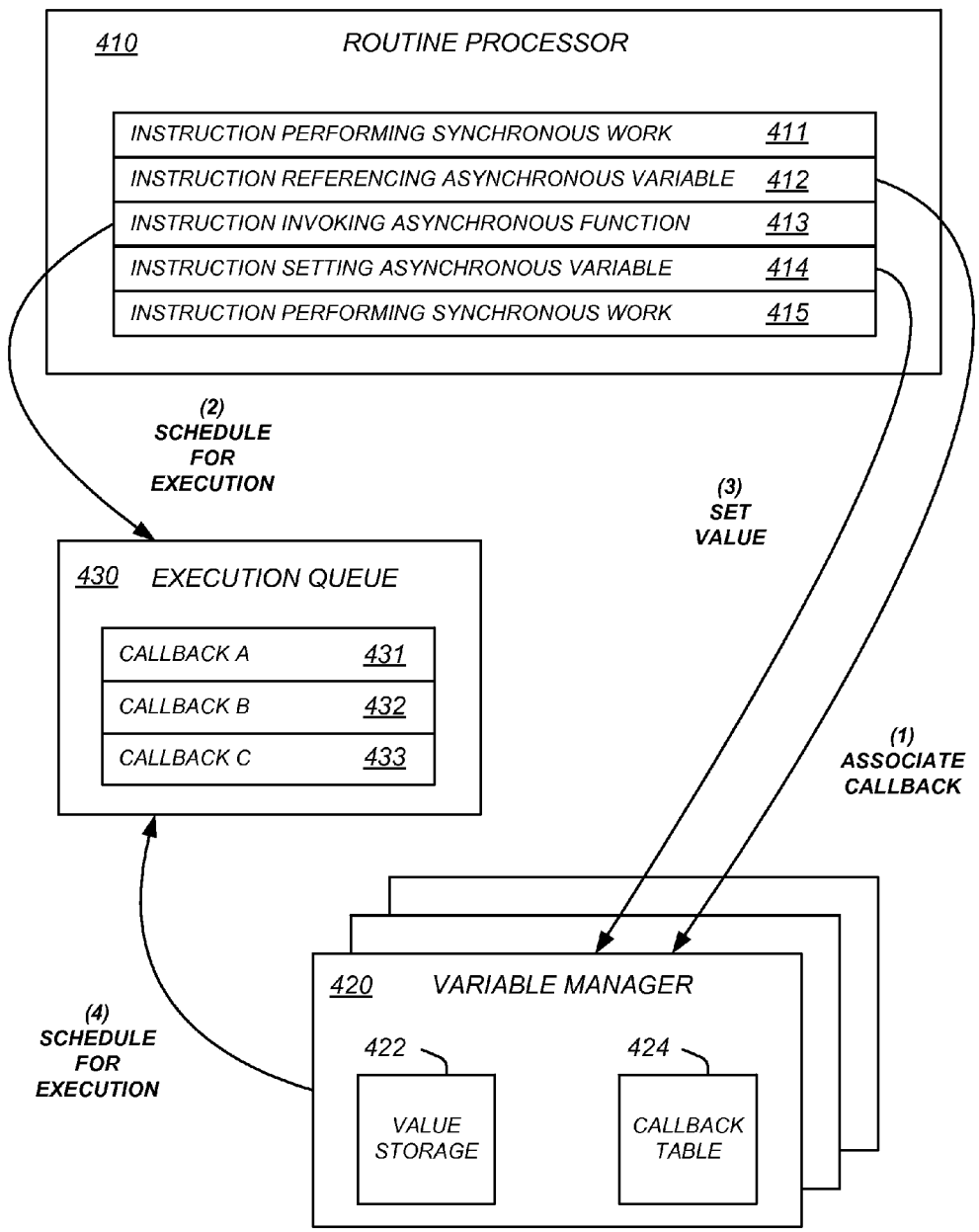
FIG. 4 is a block diagram illustrating the interaction between a routine processor, an execution queue, and a variable manager in accordance with one embodiment.
Figure 5:
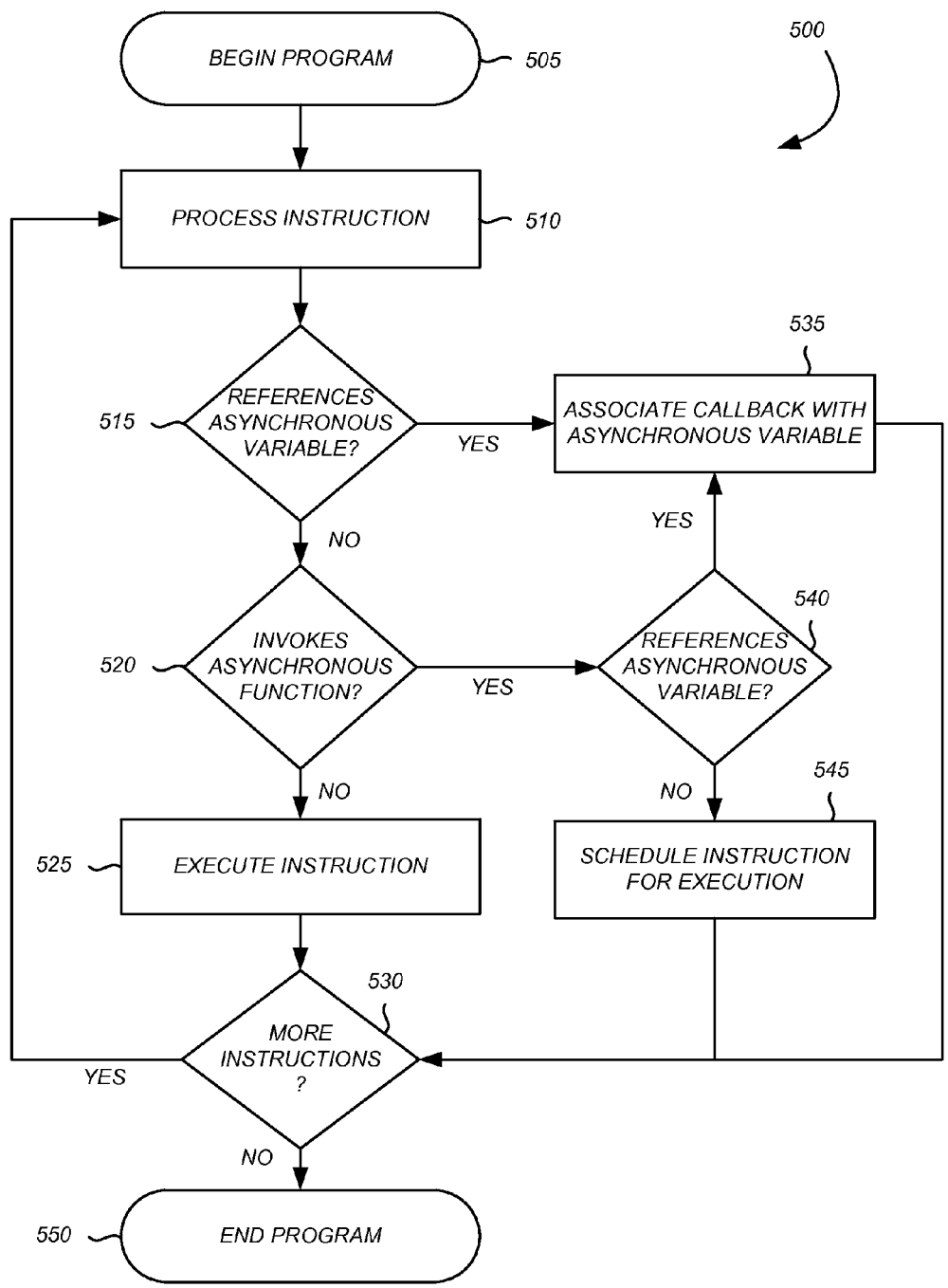
FIG. 5 is a flow diagram illustrating a sample routine for processing an asynchronous workflow decision module, in accordance with one embodiment.
Figure 6:
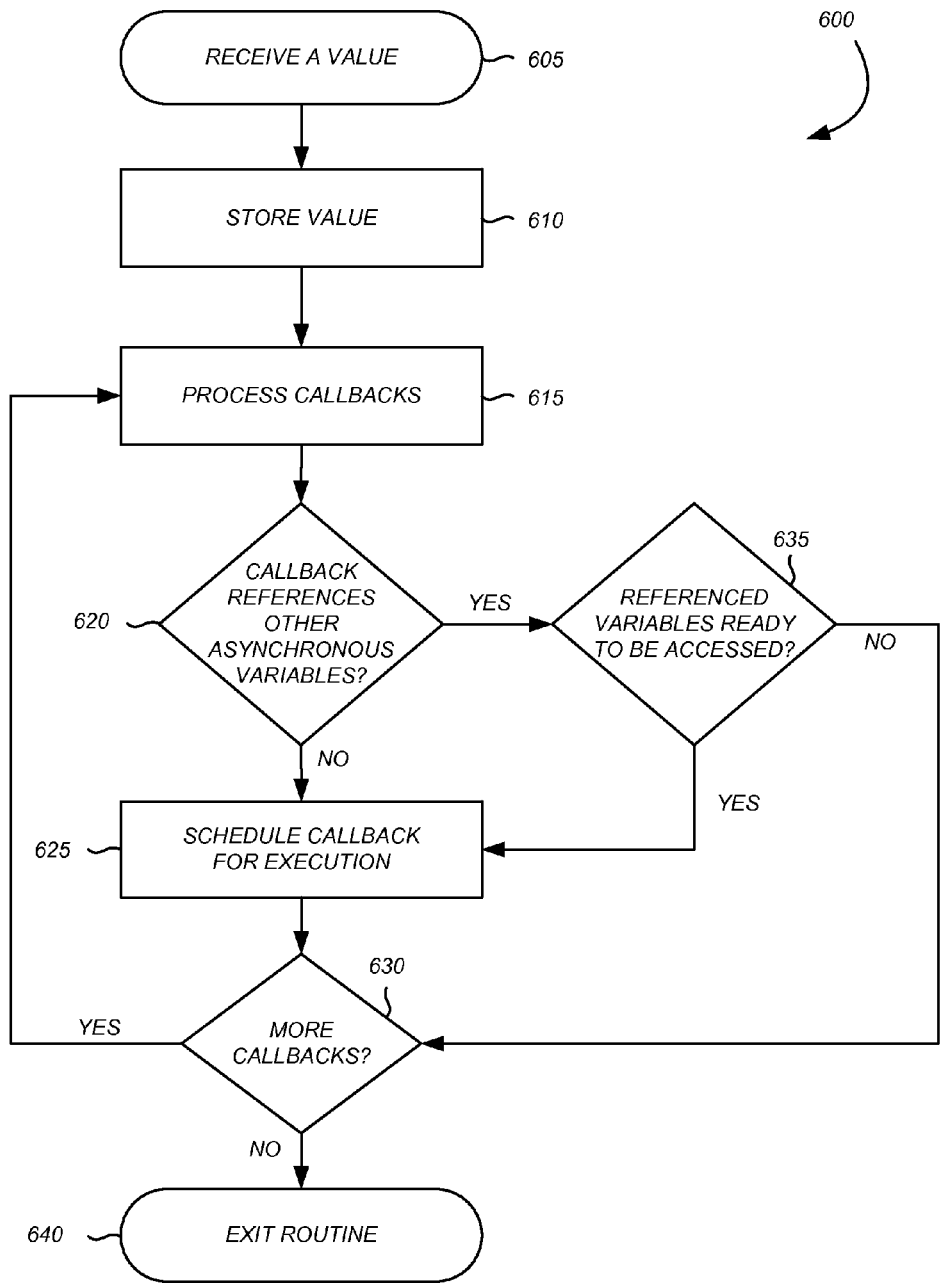
FIG. 6 is a flow diagram illustrating a sample routine for schedule asynchronous execution of callback functions, in accordance with one embodiment.

FIGS. 4, 5, and 6 illustrate the use of several components provided to developers to facilitate asynchronous programming of workflow applications using existing programming languages rather than WDLs. In one embodiment, a library of classes and functions are provided to Java developers, enabling development of asynchronous workflow processing applications using Java code and techniques familiar to developers of synchronous applications. In some embodiments, a library or framework can be provided to developers using the Ruby, Python, or C# programming languages, among others.

FIG. 4 illustrates an example asynchronous program during execution. To facilitate asynchronous execution of programs written languages such as Java, a decision module 250 embodying workflow logic can utilize various classes and features of an asynchronous library provided for that purpose, including a routine processor 410, a variable manager 420, and an execution queue 430. In one embodiment, the variable manager 420 can be a class that is instantiated multiple times to manage the operation of multiple asynchronous variables. In some embodiments, the variable manager can be a future or a promise. A variable manager 420 can comprise value storage 422 and a callback table 424. The value storage 422 and callback table 424 can be located in electronic storage areas, such as memory, a data store, a hard disk, etc.

Program instructions referencing an asynchronous variable can have callback functions associated with the variable so that the program instruction can be executed in response to a value being stored in the variable, even though the instruction can be processed by the routine processor 410 at an earlier time. This technique allows a workflow processing application developer to write program instructions which reference variables that may not have values when the workflow processing application initially executes the instruction. The components illustrated in FIG. 4 can ensure that the instruction will actually execute in response to a value being present.

The routine processor 410 can determine when a program instruction references an asynchronous variable, and instead of executing the instruction, the routine processor 410 can associate with the variable a callback to the instruction. The variable manager 420 can control access to the value storage 422, throwing an exception or otherwise raising an error in response to an attempt to access the variable being made at a time a value is not present, and executing callback functions listed in the callback table 424 in response to a value being loaded into value storage 422. A callback can be the signature or memory address of a program instruction to be executed. In some embodiments, a callback can comprise executable code or a signature of an executable program routine. In some multi-threaded embodiments, a separate thread can begin or continue execution in response to a value be loaded into value storage 422. In some embodiments, various features of the routine processor 410 can be performed instead by a variable manager 420, and various features of a variable manager 420 can be performed by the routine processor 410. In some embodiments, the value of an asynchronous variable can be set by an external process or other application.

Returning to the present example, an asynchronous workflow routine implemented by a decision module 250 can execute in order to process a purchase from a retail web site. The workflow routine can include instructions 411-415. The routine processor 410 can load the instructions into its memory space, receive a pointer to the instructions in the memory space of another process, or otherwise obtain access to the instructions. The routine processor 410 can process each instruction and determine whether to immediately execute the instruction, schedule the instruction for later execution in the execution queue 430, or associate with a variable manager 420 a callback to the instruction.

In the present example, instruction 411 can perform basic setup work, such as loading the buyer's account information. Instructions which do not reference an asynchronous variable and are not marked for asynchronous execution can be executed immediately.

Instruction 412 can reference an asynchronous variable, such as a Boolean true/false flag confirming that the product to be purchased is in stock. In some Java-based embodiments, the workflow application developer designates a variable as an asynchronous variable by annotating the variable, for example with the annotation @AsyncVar. A function or other activity responsible for monitoring the inventory and setting the flag may or may not have executed at this point in the workflow. Therefore the routine processor 410 associates a callback (1) to the instruction with the variable manager 420 responsible for the asynchronous confirmation flag variable. The variable manager 420 can store the callback in the callback table 424.

Instruction 413 can invoke an asynchronous function, for example a function which instructs a customer service representative to contact to the customer making the purchase to determine the customer's satisfaction, etc. In some Java-based embodiments, the workflow application developer designates a function as an asynchronous function by annotating the function, for example with the annotation @AsyncFunc. The remaining instructions of the workflow do not need to wait for the customer service follow-up to actually be completed, because the process requires human interaction, and can therefore delay the processing of the order. Rather, the routine processor 410 can schedule the function for asynchronous execution (2) with the execution queue 430 then and move on to processing the next instruction in the workflow without regard as to whether the customer service follow-up is ever completed.

Instruction 414 can set the value of an asynchronous variable, such as the inventory confirmation flag referenced by instruction 412. The instruction can send the value (3) to the variable manager 420 responsible for the asynchronous confirmation flag variable, and the variable manager 420 can then place the value in value storage 422. The variable manager 420 can then execute the callback functions listed in the callback table 424. In the present example, a callback to instruction 412 has been stored in the callback table 424, and therefore the variable manager 420 can schedule the instruction for asynchronous execution (4) with the execution queue 430. In some embodiments, instructions which set asynchronous variables, such as instruction 414, can be scheduled for asynchronous execution with the execution queue 430 rather than executed synchronously.

Instruction 415 can be an instruction which does not reference an asynchronous variable or call an asynchronous function. For example, the instruction can update the customer account information loaded by instruction 411. In some embodiments, such instructions can be scheduled for asynchronous execution with the execution queue 430 rather than executed synchronously.

As a result of the interactions between the routine processor 410, variable manager 420, and execution queue 430, the instructions 411-415 can have an actual execution sequence of 411-414-415-413-412, even though they are written by the workflow application developer in numerical order and processed by the routine processor 410 in numerical order. Instructions 411 and 415 do not reference any asynchronous variable and do not invoke any asynchronous function, and can therefore be executed immediately after each is processed. Instruction 414 sets the value of an asynchronous variable, and can therefore be executed immediately as well. Therefore, instructions 411, 414, and 415 are executed as they are processed by the routine processor 410, in the order in which they are processed. Instruction 413 invokes an asynchronous function, and therefore is scheduled for execution with the execution queue 430, resulting in execution at some time after the routine processor 410 processes the instruction. The actual delay can range from fractions of a second to many hours or even longer. Finally, instruction 412 waits two separate times be executed: first, it waits for the asynchronous variable that it references to receive a value, and then it waits in the execution queue 430 behind those instructions which have been placed in the execution queue 430 first, including instruction 413, which was actually processed by the routine processor 410 after instruction 412.

In some embodiments, the functions of the routine processor 410 are built in to the classes which define the asynchronous functions. Rather than a single routine processor 410 which processes and schedules each program instruction, the asynchronous function classes themselves, which the program instructions instantiate, invoke, and otherwise interact with, can perform the functions of associating callbacks with variables, scheduling execution, etc. When a decision module 250 executes a program instruction related to an asynchronous class, such as invoking a method of the asynchronous class, certain processing can occur which associates callbacks to the method or schedules execution of the method. Program control can then be immediately returned to the decision module 250 without blocking the thread to actually execute the business logic of the method.

In some embodiments, the functions of the variable manager 420 are built into the classes which define the asynchronous variables. Rather than a separate object which controls access to the variable and maintains a callback table, a an asynchronous variable class defining these functions can be instantiated for manipulation as any other variable. Certain processing can occur in response to the manipulations, however, such as throwing an exception with the variable does not contain a value, executing callbacks the variable receives a value, etc.

In some embodiments, some or all of the functions attributed above to the routine processor 410, the variable manager 420, and the execution queue 430 can instead be performed by virtual machine or other runtime framework.

FIG. 5 is a flow diagram illustrating a sample routine 500 for execution of an asynchronous workflow processing application utilizing a routine processor 410, a variable manager 420, and an execution queue 430, as described above. In this implementation, a stateless, asynchronous decision module 250 determines actions to execute in order to advance the workflow, as described in detail above. For example, the decision module 250 can comprise instructions 411-415, as illustrated in FIG. 4 and described above. The decision module 250 can also include implementations of the activity modules 260, or the activity modules 260 can be separate program modules configured to operate in an asynchronous workflow processing environment. The execution of the decision module 250 and the management of the data referenced within can occur under the control of a routine processor 410.

At block 505, the asynchronous decision module 250 is initialized. Machine-readable code, Java bytecode, source code, or another embodiment of program instructions can be loaded into the memory of the workflow processing server 120, depending on the specific implementation of the decision module 250 and routine processor 410.

The routine 500 then proceeds to block 510, where an instruction of the asynchronous decision module 250 is prepared for processing. The processing can involve parsing the instruction to determine its component parts in order to facilitate the operation of the routine processor 410 during subsequent blocks of the routine 500.

The routine 500 then proceeds to decision block 515, where the routine processor 410 determines whether the instruction references an asynchronous variable. As described above with respect to FIG. 4, the instruction can be one of instruction 411-415. If the instruction does reference an asynchronous variable, as instruction 412 does, execution of the routine 500 proceeds to block 535 where the routine processor 410 associates with the variable a callback to the instruction. If the instruction does not reference an asynchronous variable, as instructions 411, 413, and 415 do not, execution proceeds to decision block 520.

At decision block 520, the routine processor 410 determines whether the instruction is a call to an asynchronous function. When the instruction does not invoke an asynchronous function, as instructions 411 and 415 do not, execution of the routine 500 proceeds to block 525.

At block 525, the routine processor 410 can execute an instruction immediately in response to a determination in block 520 that there is no asynchronous aspect to the instruction. Examples of such instructions include instructions 411 and 415, described above with respect to FIG. 4. In some embodiments, even such non-asynchronous instructions can be loaded into the execution queue 430.

Returning to block 520, if the instruction does invoke an asynchronous function, as instruction 413 does, execution of the routine 500 proceeds to decision block 540, where the routine processor 410 determines whether the asynchronous function references an asynchronous variable, and if so, the routine 500 executes the processing described above with respect to block 535. If the asynchronous routine does not reference an asynchronous variable, the routine 500 can proceed to block 545 where the asynchronous function can be scheduled for execution at the earliest available time by being placed in the execution queue 430.

After blocks 525, 535, and 545, the routine 500 proceeds to decision block 530 where the routine processor 410 determines whether there are more instructions to process. If there are more instructions to process, execution of the routine 500 returns to block 510. Upon returning to block 510, another instruction can be processed as described above, and execution proceeds to decision block 515, where the routine processor 410 determines whether there are asynchronous variables referenced by the application. Otherwise, execution proceeds to block 550, where the routine 500 terminates.

FIG. 6 is a flow diagram illustrating a sample routine 600 implemented by the variable manager 420 for execution in response to receipt of a value to store in value storage 422. Execution of the routine 600 begins at block 605, where the variable manager 420 receives a value. For example, in response to instruction 414, described above with respect to FIG. 4, being executed, the value to be stored can be a simple true/false Boolean flag indicating whether or not the product to be purchased is currently in stock. Execution of the routine 600 then proceeds to block 610.

At block 610, the variable manager 420 places the value in value storage 422. In the current example, a Boolean true or false value is placed in value storage 422. Execution of the routine 600 then proceeds to block 615.

At block 615, the variable manager 420 processes any callbacks associated with the variable. In the current example, the routine processor 410 registered a callback to instruction 412, which uses the inventory confirmation flag to perform further processing. The variable manager 420 can retrieve the callback from the callback table 424, and the routine 600 can then proceed to decision block 620.

At decision block 620, the variable manager 420 determines whether the instruction associated with the callback references other asynchronous variables. If the instruction does reference other asynchronous variables, execution of the routine 600 can proceed to decision block 635, described next. Otherwise, execution proceeds to block 625, described below.

At decision block 635, the variable manager 420 determines whether the other asynchronous variables referenced by the instruction have values and are therefore ready to be accessed. If all other asynchronous variables are ready to be accessed, execution can proceed to block 625, described below. Otherwise, execution can proceed to decision block 630, described below. In some embodiments, the variable manager 420 can remove the callback from the callback table 424 and associate with the other variables a callback to the instruction if there is not one already associated. Execution of the instruction will now depend on the other asynchronous variables referenced by the instruction. Each has a callback to the instruction in its respective callback table. In response to those variables becoming available and their callbacks being processed according to the routine 600, the current variable can be consulted to determine wither it has a value and is ready to be accessed. Unless the Boolean true/false value received in block 605 has been removed from value storage 422, the current variable will confirm that it is available for accessing. If for some reason the Boolean value received in block 605 has been removed from value storage 422, the other variable managers can register with the current variable a new callback to the program instruction, delete the callback from their own callback tables 424, and proceed with execution as described herein.

In the current example, there were no other variables referenced by instruction 412, and therefore execution of the routine 600 can proceed from block 620 to block 625. At block 625, the variable manager 410 can schedule the program instruction associated with the callback for execution by placing it in the execution queue 430. Execution of the routine 600 can then proceed to decision block 630.

At decision block 630, the variable manager 410 can determine whether there are more callbacks associated with the current variable. If there are, execution of the routine 600 can return to block 610. In the current example, there are none. Therefore, execution can proceed to block 640, where the routine 600 terminates.

Error Handling in Asynchronous Applications

Application developers utilizing the asynchronous workflow programming components and techniques described above can implement asynchronous workflow decision modules 250 using their programming language of choice, for example Java. Providing libraries and components to implement exception-based error handling can further help to make the asynchronous workflow development process simpler by again leveraging techniques that application developers are already familiar with.

Exception-based error handling can use special programming constructs, such as try/catch blocks, to trap program exceptions and deal with them gracefully. The application developer places program instructions inside the "try" block of the try/catch block, and the program instructions are automatically associated with an error-handling routine consisting of program instructions placed inside an accompanying "catch" block of the try/catch block. In some embodiments, a "finally" block can be included, creating a try/catch/finally block. The program instructions placed in the finally portion can be executed regardless of whether an exception is thrown during execution of one of the instructions in the try block, and regardless of whether the program instructions inside the catch block are executed. In some embodiments, the catch block can be omitted, creating a try/finally block.

Figure 7:
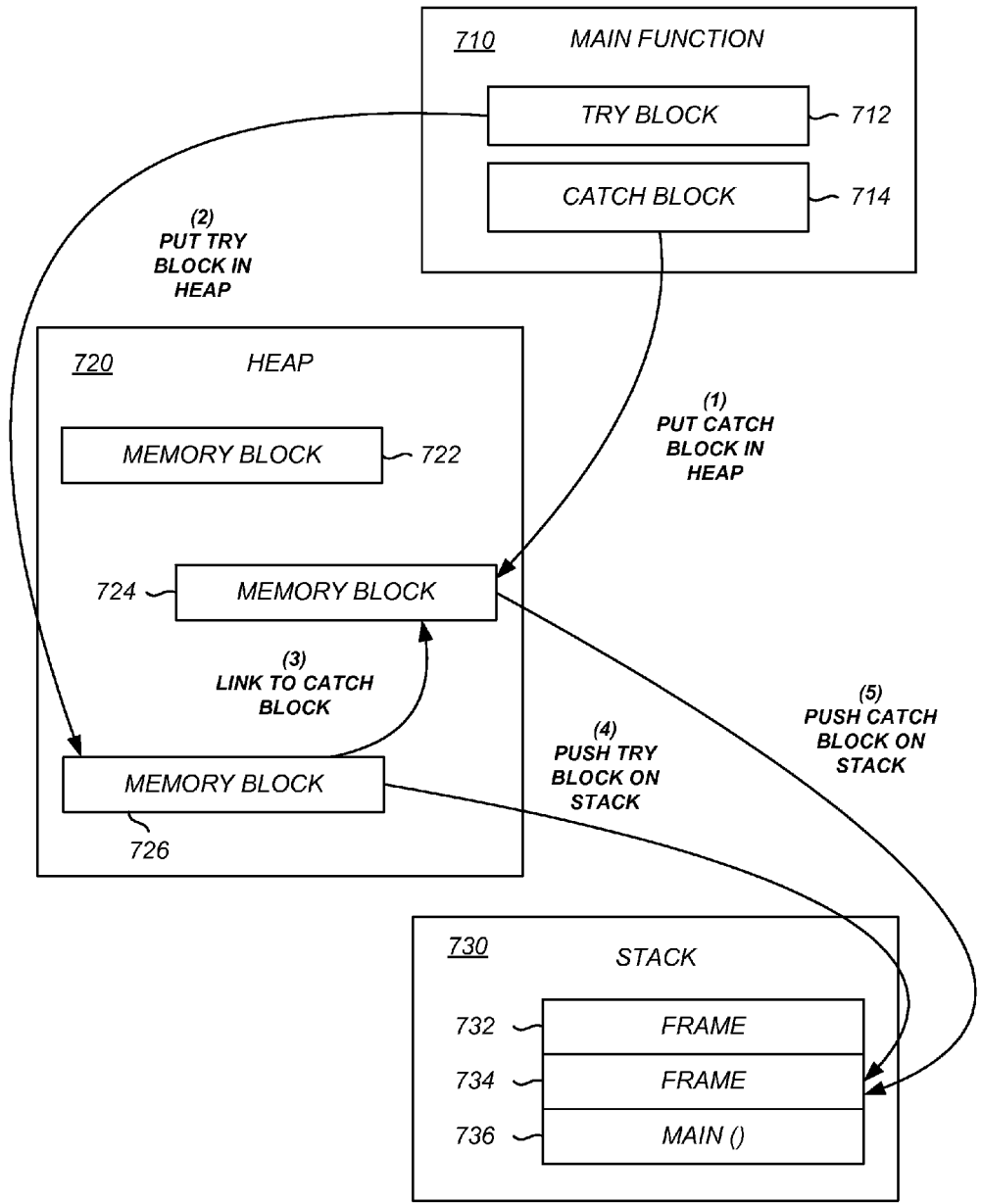
FIG. 7 is a block diagram illustrating the interaction between an asynchronous routine, a memory heap, and a call stack in accordance with one embodiment.

FIG. 7 illustrates an example interaction between a function 710, a memory heap 720, and a call stack 730, such as might occur when processing a try/catch block. The function 710 is an asynchronous function with a try/catch block 712, 714. The heap 720 can have memory blocks 722, 724, and 726. The call stack 730 can have stack frames 732, 734, 736. Note that the call stack 730 and memory heap 720 refer to the memory structures used by, for example, an operating system to manage execution and memory resources of threads and processes. The call stack 730 and memory heap 720 do not refer to the generic data structures named stack and heap.

When an asynchronous function 710 with a try/catch block 712, 714 is initially executed, it is pushed onto the stack 730, for example at stack frame 736. The catch block 714 can then be sent (1) to the heap 720 until it is needed. For example, the catch block 714 can be stored in memory block 726, or in any other memory block in the heap 720. This is unlike a synchronous execution, where the catch block 714 would be pushed to the stack at frame 734 before any instructions in the try block 712 are pushed and executed. In an asynchronous setup, the instructions contained within an asynchronous function 710 are not pushed directly to the stack 730 for execution, but are rather sent to the heap 720 to be scheduled for execution, and only when they are executed are they pushed to the stack 730. Therefore, the instructions of the try block are also sent (2) to the heap 720 until they are scheduled for execution. The instructions of the try block 712 can be stored in memory block 724, or any other memory block. The instructions of the try block 712 can then be linked (3) to the catch block 714, so that when an exception is encountered by an instruction of the try block 712, the catch block 714 can be pushed to the stack 730 in order to handle the exception.

When an instruction in the try block 712 is to be executed, it is pushed (4) to the stack 730. If an exception is thrown during execution of a try block 712 instruction, the instruction is popped from the stack 730 and the catch block 714 is pushed (5) to the stack 730 for execution. In embodiments containing a finally block, a similar procedure is used to link the finally block to the try block 712 instructions and the catch block 714, and the finally block is pushed to the stack 730 after the catch block 714 executes, or after an exception is thrown in a try/finally block configuration.

Figure 8:
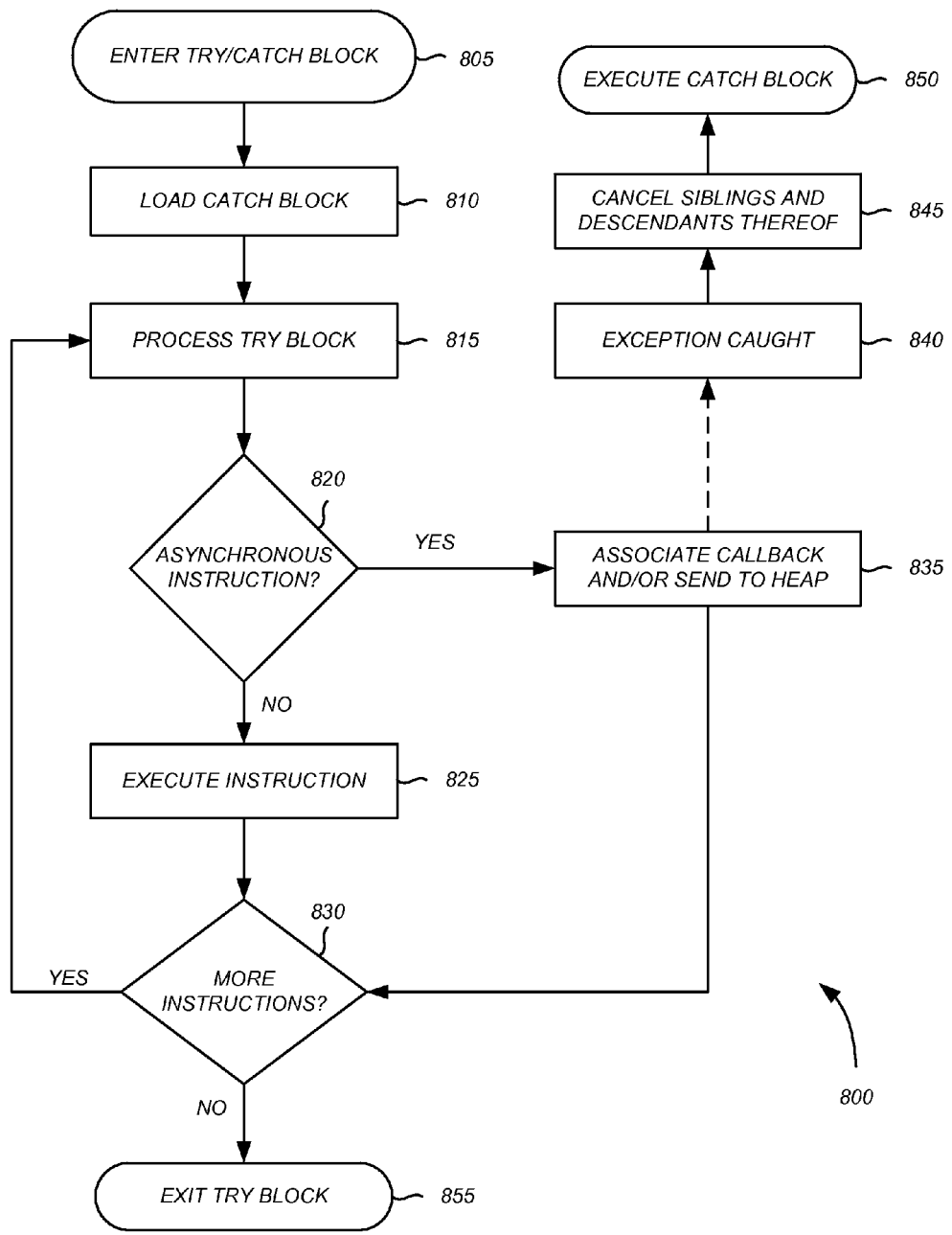
FIG. 8 is a flow diagram illustrating a sample execution pattern involving an asynchronous routine implementing exception-based error handling, in accordance with one embodiment.

FIG. 8 is a flow diagram illustrating an execution pattern 800 that can occur when an asynchronous routine 710 with a try/catch block executes and catches an exception. The execution pattern 800 is discussed with continuing reference to the components illustrated in FIG. 7 and the sample program instructions 411-415 illustrated in FIG. 4.

The execution pattern 800 begins at block 805, when an asynchronous routine 710 enters a try/catch block. The execution pattern 800 then proceeds to block 810.

At block 810, the catch block 714 is loaded into the memory heap 720. The asynchronous routine 710 can be a method of a class designed to produce this execution path 800, and the class itself can load the catch block 714 into the heap 820 during execution of the routine 710. In some embodiments, a separate the routine processor, such as the routine processor 410 described with respect to FIG. 4, can process the individual instructions of the routine 710 and load the catch block 714 into the heap 720. In some embodiments, the Java Virtual Machine or some other runtime executable or library can process the routine 710 and load the catch block 714 into the heap 720. In response to the catch block 714 being loaded into the heap 720, the execution pattern 800 proceeds to block 815.

At block 815, processing of the instructions in the try block 712 can begin. Proceeding to decision block 820, the asynchronous routine class can determine whether each individual instruction has an asynchronous component, such as a reference to an asynchronous variable, invocation of another asynchronous routine 710, etc. For example, instruction 412 and instruction 413 have asynchronous components. For instructions of that type, the execution pattern 800 can proceed to block 835, described below. Otherwise, the execution pattern proceeds to block 825, for example in response to the instruction being instruction 411 or instruction 415.

At block 825, the instruction is executed immediately because there is no asynchronous aspect to the instruction. If an exception is thrown, the catch block 714 can be executed because the asynchronous routine is still in the process of executing. In some embodiments, the catch block is pushed to the stack 730 in block 810, as well as being sent to the heap 820, specifically to facilitate error handling of program instructions performed synchronously, such as in block 825. In some embodiments, all instructions are sent to the heap 720, associated with the catch block 714 there, and scheduled for execution rather than executed immediately.

When an instruction is executed synchronously, as in block 825 above, the execution pattern proceeds to decision block 830 in response to there being no exception thrown. At decision block 830, the asynchronous routine class, Java virtual machine, or other runtime executable or library determines whether there are additional instructions to process. If so, the execution pattern returns to block 815. Otherwise, the execution path terminates at block 855.

Returning to block 820, in response to the asynchronous routine class determining that there is an asynchronous component to the instruction, the execution pattern can proceed to block 835. At block 835, the asynchronous routine class or another component can associate with an asynchronous variable a callback to the instruction, send the instruction to the heap 720 for scheduled execution, or both, depending on the specific implementation.

At some future time the instruction can be executed, either by callback or scheduled execution. The execution pattern 800 can proceed to block 840 if an exception is caught, indicating a program error related either to the instruction or to another instruction initialized, directly or indirectly, by the instruction. The execution pattern 800 then proceeds to block 845.

At block 845, all sibling instructions and functions that are either in the process of executing or are pending are cancelled, as described below with respect to FIG. 9. One all siblings have been cancelled, the catch block 714 can be executed at block 850.

In response to an exception being thrown in a synchronous program, the call stack is rolled back until a catch block is encountered, and the catch block is then executed. In asynchronous programs, there is no call stack that tracks each and every function and instruction that is currently in the process of being executed, because there can be more than one processor executing instructions in parallel, and also because some instructions may not be executed until after the asynchronous routine has terminated execution and been popped from the stack.

Figure 9:
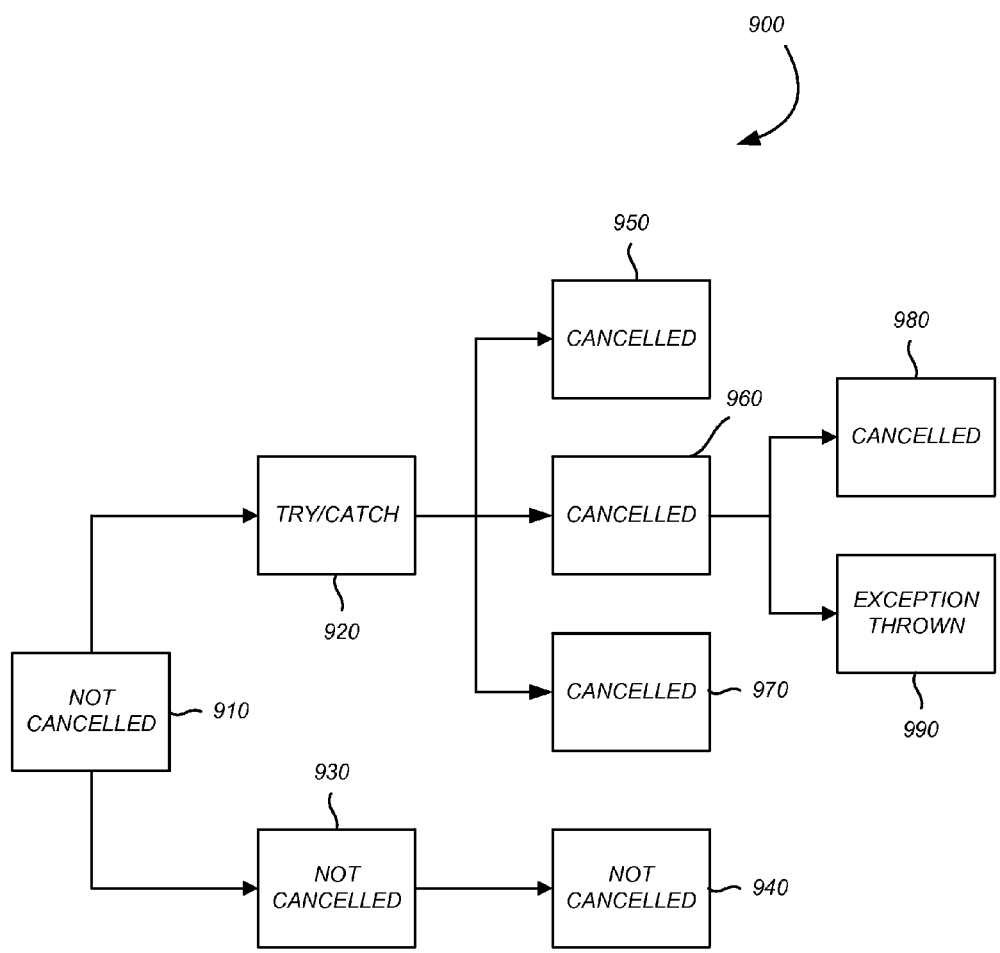
FIG. 9 is a data structure diagram illustrating the relationships between function calls, in accordance with one embodiment.

An execution tree 900, such as that illustrated in FIG. 9, can facilitate termination of certain in-progress and pending calls in response to an exception being thrown, even in asynchronous and multi-threaded systems The execution tree 900 can be used to track the execution pattern of an asynchronous or parallel workflow application. In some embodiments, a component of the workflow processing system 100 can utilize the execution tree to determine which nodes are candidates for termination, with the nodes representing separate program routines. Relationships between the program routines can be determined based on the position of the program routines within the tree, and each node in a specific relationship can be a termination candidate. For example, each node that is a child, descendant, or sibling of a node that has a try/catch block can be a termination candidate.

The tree begins with a root node 910, which represents the first function or instruction that executed. In the example illustrated in FIG. 9, two functions invoked by the root node 910 are represented by child nodes 920 and 930. Child node 930 in turn invoked a single function represented by node 940.

Node 920, the other child of root node 910, represents another function that was executed. However, node 920 contains a try/catch block. Node 920 proceeded to invoke three more functions, represented by nodes 950, 960, and 970. Finally, node 960 invoked two functions, represented by nodes 980 and 990. In some embodiments, the try block and/or catch block of node 920—or a finally block, or the try, catch, and/or finally block of any other node—may also make calls to other functions which execute asynchronously or in parallel, etc.

Until each node invoked by a parent node have finished execution, including all descendants thereof, the parent node will remain in the execution tree 900 in order to track its descendant nodes so that they can be cancelled if an unhandled exception occurs. Such a procedure can help to ensure that costly descendant processes do not remain scheduled for execution if, in one example, a parent has thrown an exception, rolled back its state, and been terminated from memory. The costly child process may no longer be necessary. Usage of the execution tree can facilitate cancellation of such costly child processes before they needlessly consume system resources.

In response to a descendant of 920 throwing an exception, the try/catch block of node 920 can catch the exception and prevent its propagation to the root node 910, which otherwise would jeopardize the entire execution tree 900. In the example illustrated in FIG. 9, node 990 throws an exception. None of node 920's descendants has a try/catch block to catch the exception and handle it gracefully. Therefore, each of node 920's descendant nodes are cancelled, and the try/catch block of node 920 is executed. In some embodiments, a descendant of node 920 may have a try/catch block, but the node is not positioned to catch the exception. For example, node 950 may have a try/catch block. In some embodiments, node 920 may have completely finished execution before any of its descendant nodes begins execution. Even in such embodiments, the catch block of node 920 can be executed when an exception is thrown by one of node 920's descendants. If any of the descendant nodes which are cancelled has a catch block or a finally block, and execution in the descendant node is currently in the try block, the catch and/or finally block can be executed before the node is cancelled. For example, if one of the nodes has a try/finally block with no catch block, the finally block will execute and the node will be cancelled. In some embodiments, a separate cancellation handler may be implemented, and the cancellation handler for a descendant node can execute instead of, or in addition to, the catch and finally blocks when the node is cancelled during execution.

In one embodiment, the try/catch block automatically includes program instructions to traverse the tree and cancel descendant nodes in response to an exception being caught. In one embodiment, the exception is an instance of a class which contains program instructions to cancel nodes as the exception is propagated throughout the tree. In one embodiment, a separate class is available in a Java Virtual Machine, runtime library, or similar collection of system classes. The class can be instantiated or is automatically instantiated, and traverses the execution tree 900 to cancel descendant nodes in response to an exception being thrown or caught. In one embodiment, the execution tree 900 is an instance of a class which contains program instructions to cancel, in response to an exception being thrown, all descendants of the node which caught the exception.

Conclusion

Thus, in various embodiments, the systems and processes described herein can model workflow definitions and asynchronously process workflow instances based on those models. Application developers can leverage program design techniques and exception based error-handling that they are familiar with, for example by using standard Java programming tools.

Depending on the embodiment, certain acts, events, or functions of any of the algorithms described herein can be performed in a different sequence, can be added, merged, or left out all together (e.g., not all described acts or events are necessary for the practice of the algorithm). Moreover, in certain embodiments, acts or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The steps of a method, process, routine, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y and Z," unless specifically stated otherwise, is to be understood with the context as used in general to convey that an item, term, etc. may be either X, Y or Z. Thus, such conjunctive language is not generally intended to imply that certain embodiments require at least one of X, at least one of Y and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A system for reconstructing the state of an application, the system comprising one or more hardware computing devices configured to execute:
   one or more activity modules configured to execute an action of a workflow definition; and
   a workflow decision module configured to:
      receive a first workflow history record from a data store, wherein the first workflow history record comprises data related to an event of a workflow application execution;
      determine a first activity module to execute based at least in part on the first workflow history record, wherein determining the first activity module alters the program state of the workflow decision module;
      create a first command to execute the first activity module;
      issue the first command;
      determine whether the first command completed successfully;
      if the first command completes successfully:
         replay the determination of the first activity module to execute; and
         recreate the first command;

receive a second workflow history record from the data store; and in response to receiving the second workflow history record:

disregard the recreated first command, wherein disregarding the recreated first command comprises preventing re-execution of the first command;

determine a second activity module to execute based at least in part on the altered program state;

create a second command to execute the second activity module; and issue the second command.

2. The system of claim 1, wherein disregarding the recreated first command comprises deleting the recreated first command.

3. The system of claim 1, wherein replaying the determination of the first activity module to execute comprises:

receiving again the first workflow history record from the data store; and determining again the first activity module to execute based at least in part on the first workflow history record, wherein determining again the first activity alters the program state of the workflow decision module.

4. The system of claim 1, further comprising a plurality of servers configured to process a purchase.

5. The system of claim 4, wherein the plurality of servers comprises a first server and a second server, and wherein the first server receives a workflow history record representing an action taken by the second server.

6. A computer-implemented method of reconstructing the state of an application, the method comprising:

receiving, from an electronic data store, a first event record comprising data related to an event of a workflow application at a previous time;

executing a first portion of the workflow application, wherein the execution is based at least in part on the first event record received from the electronic data store and wherein the execution alters a state of the workflow application;

creating a first command, wherein the first command is based at least in part on the execution of the first portion of the workflow application, and wherein completion of the first command advances the workflow application;

issuing the first command;

determining whether the first command completed successfully;

if the first command completes successfully:

replaying the execution of the first portion of the workflow application; and recreating the first command without re-execution of the first portion of the workflow application;

receiving, from the electronic data store, a second event record comprising data related to the completion of the first command;

executing a second portion of the workflow application, wherein the execution of the second portion is based at least in part on the altered state of the workflow application;

creating a second command, wherein the second command is based at least in part on the execution of the second portion, and wherein completion of the second command further advances the workflow application; and issuing the second command;

wherein said replaying is implemented by a computer system comprising computer hardware configured with specific executable instructions.

7. The computer-implemented method of claim 6, wherein replaying the execution of the first portion of the workflow application comprises:

receiving again the first event record from the data store; and executing again the first portion of the workflow application, wherein the executing again is based at least in part on the first event record received again from the electronic data store, and wherein execution alters again a state of the workflow application.

8. The computer-implemented method of claim 6, wherein the computer system comprises a plurality of servers.

9. The computer-implemented method of claim 8, wherein the plurality of servers comprises a first server and a second server, and wherein the first server receives the first event record comprising data related to an event of a workflow application at a previous time, the event occurring on the second server.

10. The computer-implemented method of claim 6, further comprising disregarding the recreated first command.

11. The computer-implemented method of claim 6, further comprising deleting the recreated first command.

12. The computer-implemented method of claim 6, further comprising saving, to the electronic data store, a third event record comprising data related to the second command.

13. The computer-implemented method of claim 12, wherein data of the third event relates to one of the scheduling of the second command, the execution of the second command, or the completion of the second command.

14. The computer-implemented method of claim 6, wherein issuing the first command or second command comprises causing the first command or second command to be scheduled for execution.

15. The computer-implemented method of claim 6, wherein the first command or the second command comprises processing of payment information.

16. The computer-implemented method of claim 6, wherein the first command or the second command comprises executing a workflow application.

17. Non-transitory physical computer storage comprising instructions stored therein for implementing, in one or more processors, operations for reconstructing the state of an application, the operations comprising:

receiving, from an electronic data store, a first event record comprising data related to a command initiated by an application at a previous time;

determining a first activity of the application, wherein the determining is based at least in part on the first event record received from the electronic data store, and wherein the determining alters a state of the application;

creating a first command to execute the first activity, wherein completion of the first command allows advancement of the application;

causing the first command to be scheduled for execution;

determining whether the first command completed successfully; and if the first command completes successfully:

replaying the determining of the first activity; and recreating the first command without causing re-execution of the first activity;

receiving, from the electronic data store, a second event record comprising data related to the completion of the first command;

determining a second activity of the application, wherein the determination of the second activity is based at least in part on the altered state of the workflow application;

creating a second command to execute the second activity, wherein completion of the second command allows further advancement of the application; and issuing the second command.

18. The non-transitory physical computer storage of claim 17, the operations further comprising saving, to the electronic data store, a third event record comprising data related to the second command.

19. The non-transitory physical computer storage of claim 17, the operations further comprising disregarding the recreated first command.

20. The non-transitory physical computer storage of claim 17, the operations further comprising deleting the recreated first command.

21. The non-transitory physical computer storage of claim 17, wherein at least one of the first activity or the second activity is execution of a workflow application.

22. The non-transitory physical computer storage of claim 17, wherein at least one of the first activity or the second activity is related to processing purchases.

23. The non-transitory physical computer storage of claim 17, wherein the application is a distributed application executing on a plurality of servers.

24. The non-transitory physical computer storage of claim 23, wherein the application is a distributed application, wherein the plurality of servers comprises a first server and a second server, and wherein the first server receives the first event record comprising data related to an event of the distributed application, the event occurring at a previous time on the second server.

25. The non-transitory physical computer storage of claim 17, the operations further comprising serializing the altered state.

26. The non-transitory physical computer storage of claim 25, the operations further comprising deserializing the altered state.

* * * * *